No. 11,738. Reissued May 2, 1899.
F. E. MELLINGER.
WEIGHING SCALE.
(Application filed May 14, 1898.)
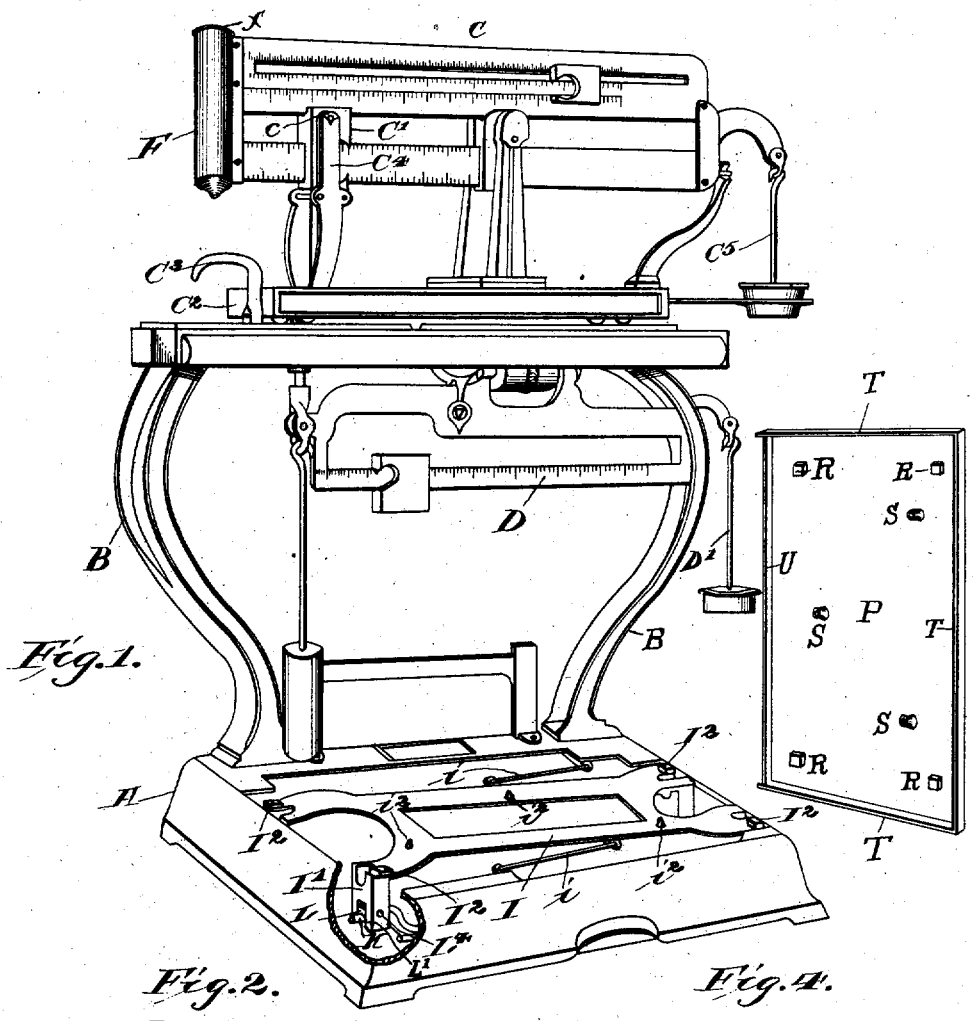
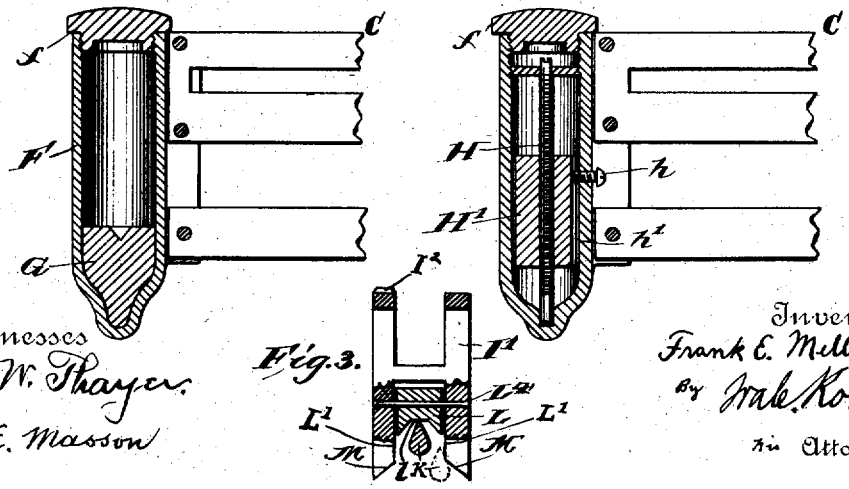
Witnesses
H. W. Thayer.
E. E. Masson
Inventor
Frank E. Mellinger
By Jake Kochne
his Attorney

UNITED STATES PATENT OFFICE.

FRANK E. MELLINGER, OF DAYTON, OHIO, ASSIGNOR TO THE COMPUTING SCALE COMPANY, OF SAME PLACE

WEIGHING-SCALE.

SPECIFICATION forming part of Reissued Letters Patent No. 11,738, dated May 2, 1899.

Original No. 577,516, dated February 23, 1897. Application for reissue filed May 14, 1898. Serial No. 680,757.

*To all whom it may concern:*

Be it known that I, FRANK E. MELLINGER, of Dayton, in the county of Montgomery, State of Ohio, have invented certain new and useful Improvements in Weighing-Scales; and I do hereby declare the following to be a full, clear, and exact description of the same, reference being had to the accompanying drawings, forming a part of this specification, and to the letters of reference marked thereon.

This invention relates to improvements in weighing-scales, the invention being more especially, though not exclusively, applicable to price-scales, the objects being, first, to secure a more perfect gravity adjustment for the beam which cannot be tampered with by unskilled persons, and, secondly, to provide an improved means for supporting the platform, whereby the assembling of the parts is facilitated and the manufacture simplified.

The invention consists in certain novel details of construction and combinations and arrangements of parts, all as will be now described, and pointed out particularly in the appended claims.

Referring to the accompanying drawings, Figure 1 is a perspective view of a scale with portions broken away and the platform turned upon edge to show the improvements. Figs. 2 and 3 are detail sectional views. Fig. 4 is a detail section showing a modification.

Like letters of reference in the several figures denote the same parts.

The scale illustrated is of the ordinary form of weighing and price scale now on the market, and I will not describe the construction of the same further than to say that A indicates the base for the platform and its levers, and B the upright supports for the beams or indicating mechanism, which latter in the form shown consists, first, of a price-beam C with means for varying the distance between its pivotal point and the head-block C′, through which the motion of the platform-levers is transmitted to the beam, and, secondly, of a weighing-beam D, pivoted in fixed relation to the platform-lever connection E.

The distance between the head-block and pivot of the price-beam is varied by mounting the beam on a carriage $C^2$, moved by handle $C^3$, and providing a stop-rest $C^4$ for the knife-edge bearings c of the head-block. At the free ends both beams carry the usual pendulous counterweight-supports $C^5$ and $D^5$.

The price-beam in this scale and in all other scales where the beam or lever is balanced on its pivots must have its center of gravity slightly below its line of pivots, so as to have a small excess of weight below the line of pivots of said beam or lever, and thus give the proper degree of sensitiveness and stability to the movement of said beam.

It is common in scale beams or levers to so adjust their centers of gravity vertically with relation to their pivots by setting said pivots slightly above the center of gravity of the beam as that the beam will be neither too sluggish nor too unstable, and to readily and cheaply secure this adjustment when the beams or levers are manufactured in quantities it is customary to provide the beam with what is known as an "adjustable gravity-weight"—in other words, a weight the adjustment of whose vertical height or position upon the beam changes the center of gravity of the beam which determines the stability of said beam. Ordinarily this adjustment is only necessary when the scale is first set up, requiring the services of an expert to secure a proper balance of each beam; but inasmuch as the weight is in a most exposed position when any slight difficulty occurs, requiring, for instance, the adjustment of the tare-weight, the inexperienced person tries to overcome the difficulty by adjusting the gravity-weight, the result being that the services of an expert are required to readjust the scale. In my present invention I have entirely overcome this difficulty and provided a means whereby an expert understanding the scale may at once make the proper adjustment for gravity, but at the same time the adjusting means is entirely removed from ordinary observation and, if desired, may be made of such character as to be incapable of adjustment without special mechanism, and for this purpose I provide on the rear end of the price-beam a vertically-arranged chamber or casing F. The chamber is perfectly cylindrical, with its longitudinal center in this instance substantially at right angles to the longitudinal center of the beam, as shown clearly in Figs. 2 and 4, the top, if desired, being closed by a screw-cap *f*.

In the preferred manner of adjusting the gravity of the beam so as to adjust the right weight above the pivotal center, previously-shaped ingots or portions of cold lead or other soft metal are driven into this chamber, as shown at G, Fig. 2, (or melted lead poured therein,) until the proper point is reached, or, if desired, a greater quantity of lead than is necessary is driven or poured in and the surplus bored out. Thus the beams may be manufactured in quantity and subsequently balanced accurately in this manner.

It is also obvious that instead of filling the chamber F with more or less lead or other soft metal to obtain the proper gravity adjustment of each beam or lever the casing or chamber F may be cast in the first place with more metal in its bottom than is required and then drilling or otherwise removing the surplus in properly adjusting the gravity of each beam or lever.

In every instance there must exist a capability of varying the center of gravity of the weight in a vertical direction, and the use of the words "vertically adjustable" or equivalent in the claims is intended to mean having the capability of vertical variation of its center of gravity.

Although I have shown in this particular instance the chamber or casing F arranged vertically and mounted upon one end of the beam, it is merely to perform the additional function of rigidly uniting the upper and lower graduated members of the beam, it being clear that the function of adjusting the gravity of the beam or lever with relation to its line of pivots will be equally performed if the casing or chamber F be arranged substantially parallel to and either above or below the line of pivots on said beam or lever.

While I prefer to employ lead, it is obvious that an adjustable weight may be employed, as illustrated, for instance, in Fig. 4, wherein H indicates a vertical screw journaled in the chamber and having working upon it a weight H', held against rotation by a small set-screw *h*, working in a spline *h'* in the weight. The end of the screw H may be provided with a slot for a screw-driver and covered in or closed by the cap, as in the first instance. Whatever the form of the weight employed be, it should be of such character as to prevent any possible shifting from one side or the other of the chamber, and for this reason it is preferable to drive in previously-shaped ingots of soft metal or pour in melted lead or employ a sliding weight, as shown.

When the gravity of the beam or lever has been properly adjusted by employing weight in the chamber F in either of the ways heretofore described, the cap *f* is tightly screwed into the open mouth of said chamber with a pair of pipe-tongs or other tool, and thus securely seals said chamber to prevent manipulation by unskilled persons, as well as those bent upon fraudulent and wrongful acts.

From the foregoing it is apparent that in its broader scope this feature of the present improvement consists in and anticipates the employment of a casing or chamber located upon or parallel with the scale beam or lever, a means mounted upon the scale-beam for adjusting the gravity of said beam and inclosed within said chamber, and a means for sealing the opening to said chamber.

In the practical manufacture of these scales it is found that the parts may all be manufactured of a standard gage, except the platform, which must be made to suit the individual customer, and in order to make provision for allowing of the manufacture and assembling of the parts for the purposes of testing before it is determined what particular style of platform is to be furnished—that is to say, whether an iron, marble platform, or glass, or a platform of usual character—I propose to employ what I shall term the "platform-subbase," which consists, essentially, of a spider or frame I arranged immediately beneath the platform and having at its four corners downwardly-extending bifurcated projections I' and upwardly-extending leveling-lugs $I^2$, which are adapted to support and level the platform, which is provided in the instance shown with downward projections R, engaging with said lugs $I^2$. These leveling-lugs, upon which the platform rests, are adapted to be slightly filed in order to secure a perfectly true set for the platform upon the subbase, so as to support the platform level upon the knife-edged bearings K of the platform-levers, and this may be done at the last moment and the variations in the balance compensated for by the adjustment of the tare weight or by the adjustment of the amount of shot in the pendulous counterweight-support on the weighing-beam. As a matter of convenience this subbase is held against lateral movement by hooks *i* at front and rear, and the platform is positioned and held against lateral movement on the subbase by upwardly-projecting lugs or pins $i^2$ entering corresponding openings in the under side of the platform.

The platform-levers are provided with the usual laterally-projecting knife-edge bearings K for supporting the platform or its subbase, and for coöperating with these knife-edge bearings I provide hardened-steel bearing-blocks pivotally mounted in the downwardly-extending projections whether they be connected with the platform or its subbase, part or all of said bearing-blocks being provided with V-shaped seats extending the length of said blocks. These hardened-steel bearing-blocks are lettered L in the accompanying drawings, and they are each loosely mounted upon a pin $L^4$, carried by said downward projections of said subbase and loosely fitting in a hole extending through each of said bearing-blocks L above and at right angles to said seats in said bearing-blocks, so as to render said bearings L capable of a pivotal movement in the direction of the length of the knife-edge bearings K. Thus they adjust themselves automatically in this direction to uniformly bear upon the knife-edged bearings K and prevent any undue binding or twisting action when a weight is thrown on the platform. In assembling the parts, however, when thus constructed, particularly where the parts are assembled, by unskilled persons, which is usually the case, as scales cannot be shipped assembled owing to the attending injury to the knife-edged bearings and possible breakage in their other parts, on account of which scales are shipped with the various levers and other parts dismounted and packed separately, the knife-edge bearings are apt to be seated not in the apex of the V-shaped seats of the bearing-blocks L but in the joint between the edges of the bearings and their support, and in order to prevent this in the present structure and to insure the proper entry of the knife-edge bearings when the parts are assembled the bifurcated arms of the projections are in the instance shown extended below the bearings-blocks L some distance to form vertical walls L′ on opposite sides of each of said bearing-blocks L, which walls L′ are adapted to contact with the thick edge of the knife-edge bearings K when the knife-edges of said bearings K approach the slot between the edges of said bearing-blocks L and the walls L′, and consequently prevent the knife-edges of said bearings K from entering said slot, and thus facilitate the entry of said knife-edges into said V-shaped seats in said blocks L. When the subbase and its bearing-blocks L are adapted to be set vertically upon the knife-edged bearings K, the lower ends of each of said arms I′ are beveled inwardly to form inclines M to readily deflect said knife-edge bearings into the slot between said arm I′ at each corner of said subbase should said bearings strike said inclines M when being placed in position by the inexperienced or careless. Thus the knife-edged platform-supporting bearings K as they move into place, even should they strike one of the inclined faces M of the arms I′, will be deflected therefrom directly into the slot between said arms I′, and said walls L′ insure their dropping into the V-shaped seat of said bearing-blocks L without danger of catching between the edges of said block and the walls L′, as will be readily understood by an inspection of Fig. 3, wherein the knife-edged bearing is shown in dotted lines as just being deflected from the incline and into the V-shaped seat in said bearing-block L.

To compensate for any possible inequality in the distance between the front and rear knife-edged bearings K, the V-shaped bearings L at one side of the subbase have a flattened bearing-surface, as shown at *l*. With this construction the parts may be assembled in the process of manufacture by unskilled persons without danger of wrong adjustment. In addition to providing the platform P with the downwardly-extending projections R, engaging the leveling-lugs $I^2$ of the subbase I, said platform P is also provided with downwardly-projecting lugs S, provided with sockets adapted to receive the projections $I^2$ on the subbase for preventing the lateral movement of said platform P upon said subbase I, and upon three edges of said platform P are downwardly-projecting flanges T, adapted to project over the corresponding outer edges of the scale-base A, while upon the fourth edge of said platform P is formed a downwardly-extending flange U of less depth than said flanges T, and adapted to extend across and above the scale-base A, adjacent the curved columns B, said construction of platform being adapted to produce a very light yet exceeding strong platform, which is adapted to be readily mounted level on said subbase, retained thereon against lateral movement, and at the same time cover and protect the joint between the platform P and the scale-base A.

The employment of the platform-subbase further enables the manufacturer to keep the scales practically complete in stock and at a very short notice to fit up the platform in the style desired by the purchaser, and at the same time the leveling projections in conjunction with the adjustable bearing-blocks of the platform-subbase form a substitute for the spirit-level when the platform rests on said leveling-lugs, and by successively touching the corners of said platform the manufacturer or user may readily ascertain whether or not the platform or the bearing-blocks in its subbase rest snugly at each corner upon the knife-edged bearings K, and if not then the scale is not setting level, and it must be properly set level before it will give the most satisfactory results.

Having thus described my invention, what I claim as new is—

1. In a scale, the combination with the beam, of a vertically-arranged chamber or casing rigidly mounted thereon and a gravity-weight inclosed within said chamber, whereby the sensitiveness of the balance of the beam may be adjusted, and said beam is adapted to have its center of gravity varied vertically; substantially as described.

2. In a scale, the combination with the balanced beam, of a casing having a chamber therein with its longitudinal axis at right angles to the longitudinal axis of the beam, with means for closing said chamber and a gravity-weight carried by said beam and located in said chamber in fixed position whereby the sensitiveness of the balance of the beam may be secured but adapted to have its center of gravity varied vertically; substantially as described.

3. In a scale, the combination with the beam, of the vertically-arranged casing or chamber on said beam, and the solid soft-metal gravity-weight in said chamber and adapted to have its center of gravity varied vertically; substantially as described.

4. In a weighing and price scale, the combination with the weighing-beam and independent price-beam having its pivot adjustable with relation to the platform-lever connection, of a chamber or casing on the price-beam having its longitudinal axis at right angles to the longitudinal axis of the beam, and a gravity-weight located in said chamber and adapted to have its center of gravity varied vertically, whereby the proportion of the weight below the pivot of the beam may be regulated and the sensitiveness of the balance of the beam adjusted; substantially as described.

5. In a scale, the combination with the beam, the platform-levers connected therewith, and the knife-edged bearings in said lever supporting the platform, of the platform-subbase having a series of adjustable bearing-blocks mounted thereon and adapted to engage said knife-edged bearings, one or more of said bearing-blocks having a V-shaped seat passing through their downward face for engaging said bearings, walls on opposite sides of and extending below the edges of said bearing-blocks for preventing the knife-edges of said bearings from being accidentally seated in the joint between said bearing-blocks and said walls, the series of upwardly-extending leveling projections on said subbase, and a platform resting on said leveling projections; substantially as described.

6. In a scale, the combination with the beam, the platform-levers connected therewith, and the knife-edged bearings on said levers supporting the platform; of the platform-subbase having a series of bearing-blocks pivotally mounted thereon by means of a pin passing through each of said blocks and connected to said subbase; a V-shaped seat passing through the downward face of one or more of said bearing-blocks for engaging said knife-edged bearings; walls on opposite sides of said bearing-blocks preventing the knife-edged bearings from being seated in the joint between said blocks and walls; a platform surmounting said subbase; the leveling projections and the coöperating projections and sockets in said platform and platform-subbase for readily supporting the platform-level upon said platform-supporting knife-edged bearings and preventing the horizontal movement of said platform on said subbase; substantially as described.

7. In a scale, the combination with the beam, the platform-levers having the knife-edged bearings supporting the platform, and a connection between said levers and beam; of a platform having a series of downward projections; a bearing-block pivotally connected to each of said downward projections by means of a pin passing loosely through said bearing-block and connected to said downward projection; a V-shaped seat extending through the downward face of one or more of said bearing-blocks and adapted to engage said platform-supporting knife-edged bearings; and downwardly-extending walls adjacent and below the opposite edges of each of said bearing-blocks, whereby said knife-edged bearings cannot accidentally be seated between the edges of said blocks and said walls, substantially as described.

8. In a scale, the combination with the beam, the platform-levers having the lateral knife-edged bearings, and a connection between said beam and levers, of the bifurcated platform-supporting projections having their inner sides beveled inward, the bearing-blocks provided with bearing-seats and pivotally supported in said bifurcated projections with their edges above the lower edges of the inclined surfaces a sufficient distance to form a wall on opposite sides of said bearing-blocks which prevents the knife-edges of said bearings from entering the joint, whereby the seating of the knife-edged bearings in the seats in said bearing-blocks is insured; substantially as described.

9. As an improved means for adjusting the gravity of scale beams or levers, a chamber carried rigid with the beam or lever and adapted to have more or less weight taken therefrom or placed therein and the center of gravity thereby varied vertically, and means for sealing the mouth of said chamber, whereby the sensitiveness of the balance of the beam may be adjusted, substantially as specified.

10. As an improved means for adjusting the gravity of scale beams or levers, a chamber open at one end and carried rigid with the beam or lever, said chamber being adapted to contain weight more or less near its opening to vary its center of gravity vertically; and means for sealing the opening to said chamber, whereby the sensitiveness of the balance of the beam may be adjusted, substantially as specified.

11. In a weighing and price scale, the combination with the weighing-beam and an independent price-beam having an adjustable weight-per-unit knife-edged connection between said price-beam and the platform-lever connection, of a chamber open at one end, a gravity-weight carried by said price-beam and located in said chamber and adapted to have its center of gravity adjusted vertically with reference to said price-beam, whereby the gravity of the beam and the sensitiveness of its balance may be adjusted, and means for sealing the opening of said chamber and thus prevent tampering with the gravity of said beam; substantially as specified.

12. In a scale, the combination with the fulcrumed price-beam, a poise supported thereon, and a load-receiver connected to said beam, of a weight upon said beam, a casing open at one end and inclosing said weight from ordinary view, and means for vertically adjusting the center of gravity of said weight with reference to said price-beam; whereby the proportion of the weight below the fulcrum-point of the beam may be varied and the sensitiveness and stability of the balance of the beam adjusted by the vertical adjustment of the gravity of said weight on said beam, and said weight is shielded from ordinary view and the consequent tampering therewith of the inexperienced, substantially as described.

In testimony whereof I have hereunto set my hand this 30th day of April, A. D. 1898.

FRANK E. MELLINGER.

Witnesses:
CHARLES W. JAMES,
ISAAC G. KENNEDY.